(12) United States Patent
Codrescu et al.

(10) Patent No.: US 8,417,922 B2
(45) Date of Patent: Apr. 9, 2013

(54) METHOD AND SYSTEM TO COMBINE MULTIPLE REGISTER UNITS WITHIN A MICROPROCESSOR

(75) Inventors: Lucian Codrescu, Austin, TX (US); Erich Plondke, Austin, TX (US); Mao Zeng, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 11/498,627

(22) Filed: Aug. 2, 2006

(65) Prior Publication Data

US 2008/0184007 A1 Jul. 31, 2008

(51) Int. Cl.
*G06F 9/30* (2006.01)

(52) U.S. Cl. ........................................... 712/223

(58) Field of Classification Search ................... 712/223
See application file for complete search history.

(56) References Cited

U.S. PATENT DOCUMENTS

| | | | |
|---|---|---|---|
| 5,564,056 A | | 10/1996 | Fetterman et al. |
| 6,052,522 A | * | 4/2000 | Mattela et al. ............ 703/13 |
| 6,463,525 B1 | * | 10/2002 | Prabhu .................... 712/222 |
| 6,631,460 B1 | | 10/2003 | Morris et al. |
| 6,978,359 B2 | * | 12/2005 | Miyamori ................ 712/204 |
| 7,092,526 B2 | | 8/2006 | Lee |
| 7,103,756 B2 | | 9/2006 | Morris |
| 7,228,403 B2 | * | 6/2007 | Leber et al. .............. 712/227 |
| 7,237,096 B1 | * | 6/2007 | Prabhu et al. ............ 712/218 |
| 8,127,117 B2 | | 2/2012 | Zeng et al. |
| 2005/0125640 A1 | | 6/2005 | Ford et al. |
| 2005/0203928 A1 | * | 9/2005 | Sankaran ................ 707/100 |
| 2007/0276646 A1 | | 11/2007 | Dutt et al. |

(Continued)

FOREIGN PATENT DOCUMENTS

| | | |
|---|---|---|
| EP | 0743591 | 11/1996 |
| EP | 0743592 | 11/1996 |

(Continued)

OTHER PUBLICATIONS

Hennessy, John, Patterson, David. "Computer Architecture" 3rd edition, pp. 290-294, May 15, 2002.*

(Continued)

*Primary Examiner* — Jacob Petranek
(74) *Attorney, Agent, or Firm* — Peter M. Kamarchik; Nicholas J. Pauley; Jonathan T. Velasco

(57) ABSTRACT

A method and system to combine multiple register units within a microprocessor, such as, for example, a digital signal processor, are described. A first register unit and a second register unit are retrieved from a register file structure within a processing unit, the first register unit and the second register unit being non-adjacently located within the register file structure. The first register unit and the second register unit are further combined during execution of a single instruction to form a resulting register unit. Finally, the resulting register unit is stored within the register file structure for further processing. Alternatively, a first half word unit from the first register unit and a second half word unit from the second register unit are retrieved. The first half word unit and the second half word unit are further input into corresponding high and low portions of a resulting register unit to form the resulting register unit during execution of a single instruction. Finally, the resulting register unit is stored within the register file structure for further processing.

35 Claims, 7 Drawing Sheets

U.S. PATENT DOCUMENTS

| | | | |
|---|---|---|---|
| 2010/0283131 A1 | 11/2010 | Chandrasekaran | |
| 2010/0314725 A1 | 12/2010 | Gu et al. | |
| 2011/0037156 A1 | 2/2011 | Chandrasekaran et al. | |

FOREIGN PATENT DOCUMENTS

| | | |
|---|---|---|
| GB | 2409064 | 6/1995 |
| JP | 8314717 A | 11/1996 |
| JP | 10512988 | 12/1998 |
| JP | 2005182659 A | 7/2005 |
| JP | 2005535966 A | 11/2005 |
| JP | 2009536774 A | 10/2009 |
| WO | WO9709671 A1 | 3/1997 |
| WO | WO2004015563 A1 | 2/2004 |

OTHER PUBLICATIONS

Lee, R.B.; "Subword Parallelism with Max-2"; IEEE Micro, IEEE Service Center, Los Alamitos, CA, US; vol. 16, No. 4; Aug. 1, 1996; pp. 51-59; XP000596513; ISSN: 0272-1732.

International Search Report-PCT/US07/074820, International Search Authority-European Search Authority-Dec. 13, 2007.

Written Opinion-PCT/US07/074820, International Search Authority-European Patent Office-Dec. 13, 2007.

Lee, R., et al., "Multimedia Instructions in IA-64," 2001 IEEE International Conference on Multimedia and Expo (ICME'01), pp. 555, (22 Aug. 2001).

Lee, R., et al., PLX: An Instruction Set Architecture and Testbed for Multimedia Information Processing, Journal of VLSI Signal Processing 40, pp. 85-108, May 2005.

Rathnam S. et al., "An Architectural Overview of the Programmable Multimedia Processor, TM-1", Proceedings of COMPCOM'96 'Technologies for the Information Superhighway' Digest of Papers, [online], Feb., 1996, p. 319-326, [retrieved on Feb. 10, 2012]. Retrieved from the Internet,URL, http://ieeexplore.ieee.org/stamp/stamp.jsp''tp=&arnumber=501790..

Taiwan Search Report—TW096128461—TIPO—Jan. 8, 2012.

\* cited by examiner

METHOD AND SYSTEM TO COMBINE MULTIPLE REGISTER UNITS WITHIN A MICROPROCESSOR

BACKGROUND

1. Field of the Invention

The present invention relates generally to microprocessors and, more specifically, to a method and system to combine multiple register units within a microprocessor, such as, for example, a digital signal processor.

2. Background

Typically, computer systems include one or more microprocessor devices, each microprocessor device being configured to perform operations on values stored within a memory of the computer system and to manage the overall operation of the computer system. These computer systems may also include various multimedia devices, such as, for example, sound cards and/or video cards, each multimedia device further including one or more processors, such as, for example, digital signal processors (DSPs), which perform complex mathematical computations within each respective multimedia device.

A digital signal processor (DSP) typically includes hardware execution units specifically configured to perform such mathematical calculations, such as, or example, one or more arithmetic logic units (ALU), one or more multiply-and-accumulate units (MAC), and other functional units configured to perform operations specified by a set of instructions within the DSP. Such operations may include, for example, arithmetic operations, logical operations, and other data processing operations, each being defined by an associated set of instructions.

Generally, the execution units within the DSP read data and operands from a register file coupled to the memory and to the execution units, perform the instruction operations, and store the results into the register file. The register file includes multiple register units, each register unit being accessible as a single register or as aligned pairs of two adjacent register units. However, certain specific operations, such as, for example, operations to add or subtract data, require data from separate register units within the register file to be properly aligned for execution of the instructions. Thus, what is needed is a method and system to combine multiple non-adjacent register units within a DSP during execution of a single instruction in order to enable proper alignment of data stored within such register units.

SUMMARY

A method and system to combine multiple register units within a microprocessor, such as, for example, a digital signal processor, are described. In one embodiment, a first register unit and a second register unit are retrieved from a register file structure within a processing unit, the first register unit and the second register unit being non-adjacently located within the register file structure. The first register unit and the second register unit are further combined during execution of a single instruction to form a resulting register unit. Finally, the resulting register unit is stored within the register file structure for further processing.

In an alternate embodiment, subsequent to the retrieval of the first and second register units, a first half word unit from the first register unit and a second half word unit from the second register unit are retrieved. The first half word unit and the second half word unit are further input into corresponding high and low portions of a resulting register unit to form the resulting register unit during execution of a single instruction. Finally, the resulting register unit is stored within the register file structure for further processing.

DETAILED DESCRIPTION

A method and system to combine multiple register units within a microprocessor, such as, for example, a digital signal processor, are described. Although the system described below enables a digital signal processor (DSP) to combine the register units, it is to be understood that the system may be implemented using a microprocessor device, or any other processing unit capable of combining multiple register units into a resulting larger register unit during execution of a single instruction.

Generally, execution units within the DSP read data and operands from a register file, perform instruction operations, and store the results into the register file. The register file includes multiple register units, each register unit being accessible as a single register or as aligned pairs of two adjacent register units. However, certain specific operations, such as, for example, operations to add or subtract data, require data from separate register units within the register file to be properly aligned for execution of the instructions. The embodiments described in detail below facilitate the combination/concatenation of multiple non-adjacent register units within a DSP during execution of a single instruction in order to enable proper alignment of data stored within such register units in preparation for subsequent vector operations.

In one embodiment, a first register unit and a second register unit are retrieved from a register file structure within a processing unit, the first register unit and the second register unit being non-adjacently located within the register file structure. The first register unit and the second register unit are further combined during execution of a single instruction to form a resulting larger register unit. Finally, the resulting register unit is stored within the register file structure for further processing.

In an alternate embodiment, subsequent to the retrieval of the first and second register units, a first half word unit from the first register unit and a second half word unit from the second register unit are retrieved. The first half word unit and the second half word unit are further input into corresponding high and low portions of a resulting register unit to form the resulting register unit during execution of a single instruction.

Finally, the resulting register unit is stored within the register file structure for further processing.

Figure 1:
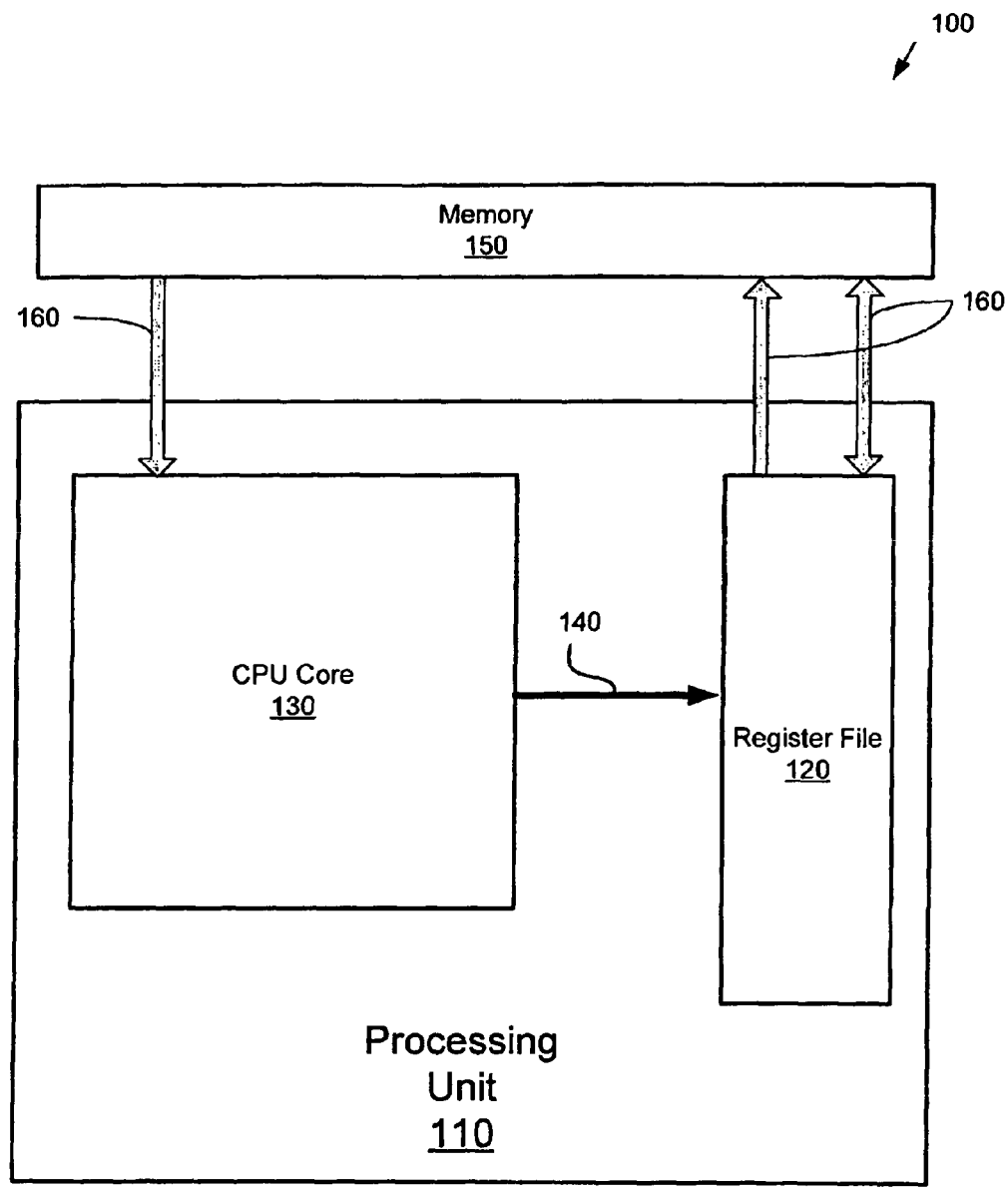
FIG. 1 is a block diagram of a digital signal processing system within which a set of instructions may be executed.

FIG. 1 is a block diagram of a digital signal processing system within which a set of instructions may be executed. As illustrated in FIG. 1, the digital signal processing system 100 includes a processing unit 110, a memory 150, and one or more buses 160 coupling the processing unit 110 to the memory 150.

The memory 150 stores data and instructions, such as, for example, in the form of Very Long Instruction Word (VLIW) packets produced by a VLIW compiler, each VLIW packet comprising one or more instructions. Each instruction of a packet is typically of a predetermined width and has a particular address in the memory 150, such that a first instruction in a packet typically has a lower memory address than a last instruction of the packet. Addressing schemes for a memory are well known in the art and are not discussed in detail here. Instructions in the memory 150 are loaded into the processing unit 110 via buses 160.

The processing unit 110 further comprises a central processing unit core 130 coupled to one or more register file structures 120 via one or more pipelines 140. The processing unit 110 may further comprise one or more microprocessors, digital signal processors, or the like.

The register file 120 further comprises a set of general register units, which support general purpose computations, and which are described in further detail below in connection with FIG. 2, and a set of control register units, which support special-purpose functionality, such as, for example, hardware loops, predicates, and other special operands.

Figure 2:
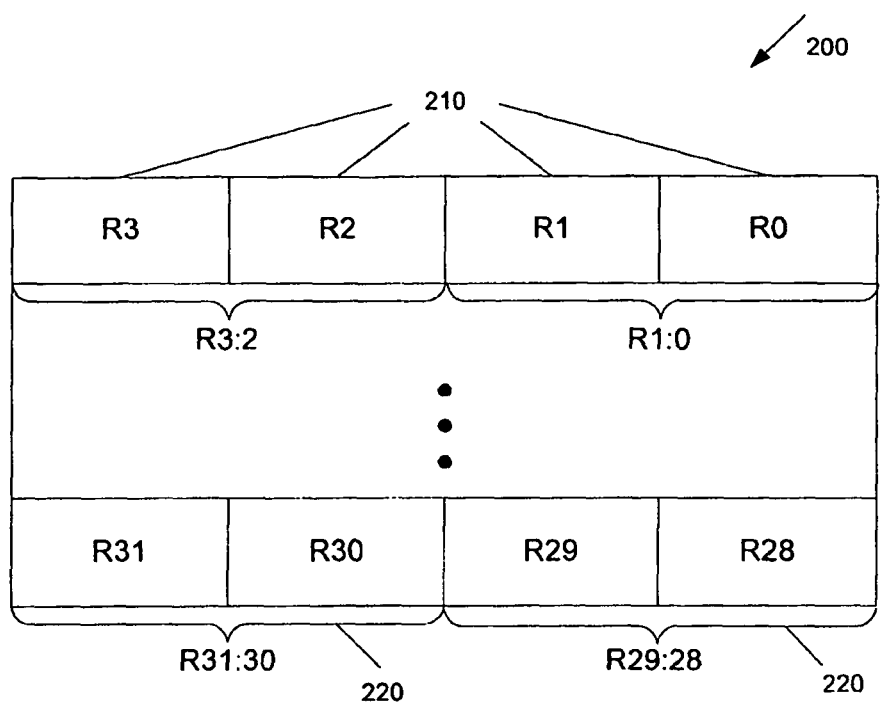
FIG. 2 is a block diagram illustrating one embodiment of a general register structure within the digital signal processing system.

FIG. 2 is a block diagram illustrating one embodiment of a general register structure within the digital signal processing system. As illustrated in FIG. 2, in one embodiment, the general register file structure 200 within the register file 120 includes multiple register units, such as, for example, thirty two 32-bit wide register units 210, each register unit being accessible as a single register or as aligned pairs 220 of two adjacent register units 210.

The general register units 210 can be referred to by multiple names based on the appropriate instruction. For example, register units 210 may be individually referred to as $R_0, R_1, \ldots, R_{30}$, and $R_{31}$. In addition, register units $R_0$ and $R_1$ may form a 64-bit register pair 220 referred to as $R_{1:0}$. Similarly, register units $R_2$ and $R_3$ may form a 64-bit register pair 220 referred to as $R_{3:2}$, register units $R_{28}$ and $R_{29}$ may form a 64-bit register pair 220 referred to as $R_{29:28}$, and register units $R_{30}$ and $R_{31}$ may form a 64-bit register pair 220 referred to as $R_{31:30}$.

In one embodiment, general register units 210 are used for general computational purposes, such as, for example, address generation, scalar arithmetic, and vector arithmetic, and provide all operands for instructions, including addresses for load/store instructions, data operands for numeric instructions, and vector operands for vector instructions.

Figure 3:
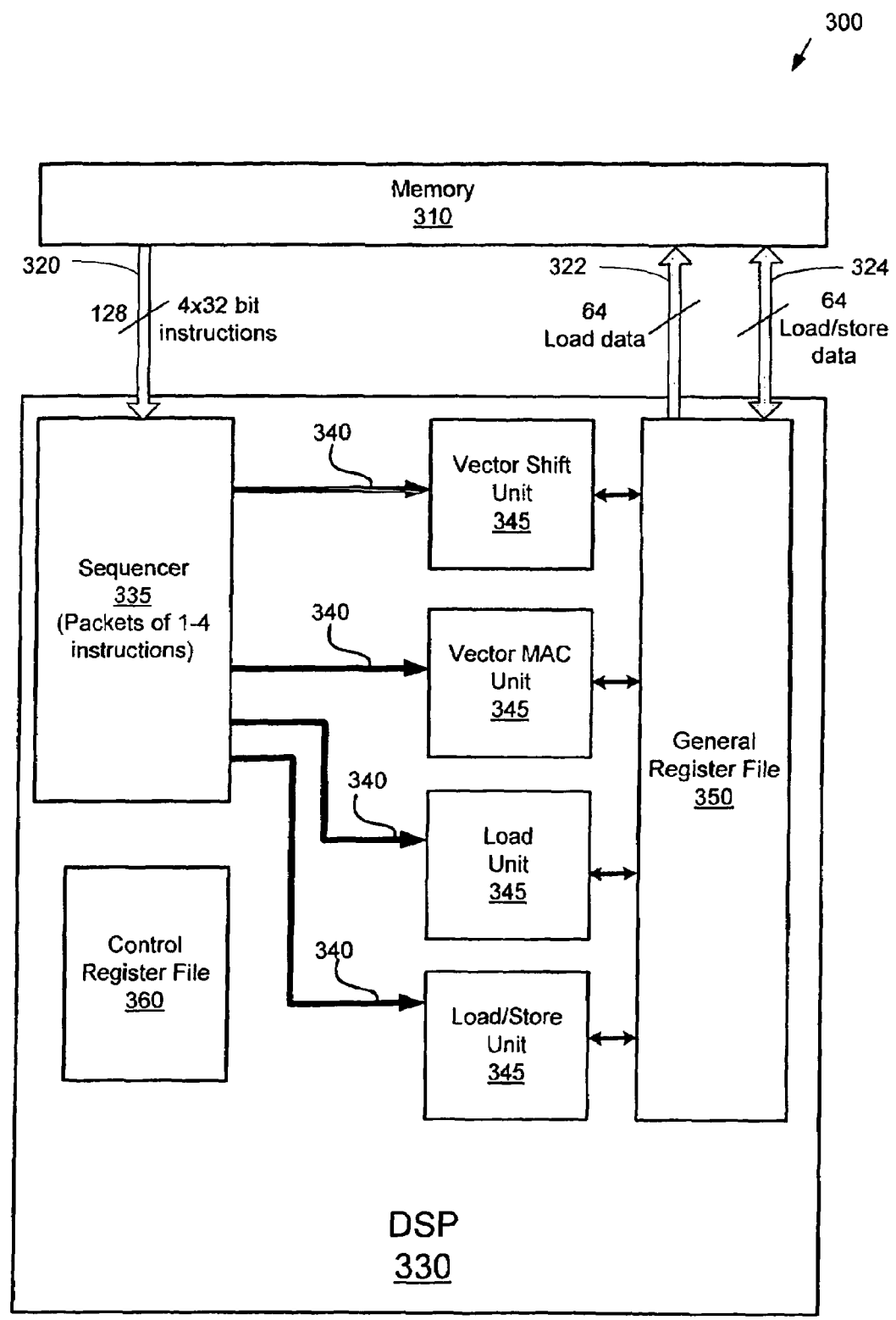
FIG. 3 is a block diagram illustrating one embodiment of a Very Long Instruction Word (VLIW) digital signal processing system architecture.

FIG. 3 is a block diagram illustrating one embodiment of a Very Long Instruction Word (VLIW) digital signal processing system architecture. The VLIW system architecture 300 includes a memory 310 coupled to a digital signal processor (DSP) 330 via an instruction load bus 320, a data load bus 322, and a data load/store bus 324.

In one embodiment, the memory 310 stores data and instructions, for example in the form of VLIW packets having one to four instructions. Instructions stored within the memory 310 are loaded to the DSP 330 via the instruction load bus 320. In one embodiment, each instruction has a 32-bit word width which is loaded to the DSP 330 via a 128-bit instruction load bus 320 having a four word width. In one embodiment, the memory 310 is a unified byte-addressable memory, has a 32-bit address space storing both instructions and data, and operates in little-endian mode.

In one embodiment, the DSP 330 comprises a sequencer 335, four pipelines 340 for four processing or execution units 345, a general register file structure 350 (comprising a plurality of general register units), such as, for example, the general register file structure 200 described in detail in connection with FIG. 2, and a control register file structure 360. The sequencer 335 receives packets of instructions from the memory 310 and determines the appropriate pipeline 340 and respective execution unit 345 for each instruction of each received packet using the information contained within the instruction. After making this determination for each instruction of a packet, the sequencer 335 inputs the instructions into the appropriate pipeline 340 for processing by the appropriate execution unit 345.

In one embodiment, the execution units 345 further comprise a vector shift unit, a vector MAC unit, a load unit, and a load/store unit. The vector shift unit 345 executes, for example, S-type (Shift Unit) instructions, such as Shift & Add/Sub operations, Shift & Logical operations, Permute operations, Predicate operations, Bit Manipulation, and Vector Halfword/Word shifts, A64-type (64-bit Arithmetic) instructions, such as 64-bit Arithmetic & Logical operations, 32-bit Logical operations, Permute operations, A32-type (32-bit Arithmetic) instructions, such as 32-bit Arithmetic operations, J-type (Jump) instructions, such as Jump/Call PC-relative operations, and CR-type (Control Register) instructions, such as Control Register transfers, Hardware Loop setup. The vector MAC unit 345 executes, for example, M-type (Multiply Unit) instructions, such as Single Precision, Double Precision, Complex, and Vector Byte/Halfword instructions, A64-type instructions, A32-type instructions, J-type instructions, and JR-type (Jump Register) instructions, such as Jump/Call Register operations. The load unit 345 loads data from the memory 310 to the general register file structure 350 and executes, for example, load-type and A32-type instructions. The load/store unit 345 loads and stores data from the general register file structure 350 back to the memory 310 and executes, for example, load-type, store-type, and A32-type instructions.

Each execution unit 345 that receives an instruction performs the instruction using the general register file structure 350 that is shared by the four execution units 345. Data needed by an instruction is loaded to the general register file structure 350 via the 64-bit data load bus 322. After the instructions of a packet are performed by the execution units 345, the resulting data is stored to the general register file structure 350 and then loaded and stored to the memory 310 via the 64-bit data load/store bus 324. Typically, the one to four instructions of a packet are performed in parallel by the four execution units 345 in one clock cycle, where a maximum of one instruction is received and processed by a pipeline 340 for each clock cycle.

In one embodiment, an execution unit 345 may also use the control register file structure 360 to execute a corresponding instruction. The control register file structure 360 comprises a set of special register units, such as, for example, modifier, status, and predicate register units.

Figure 4:
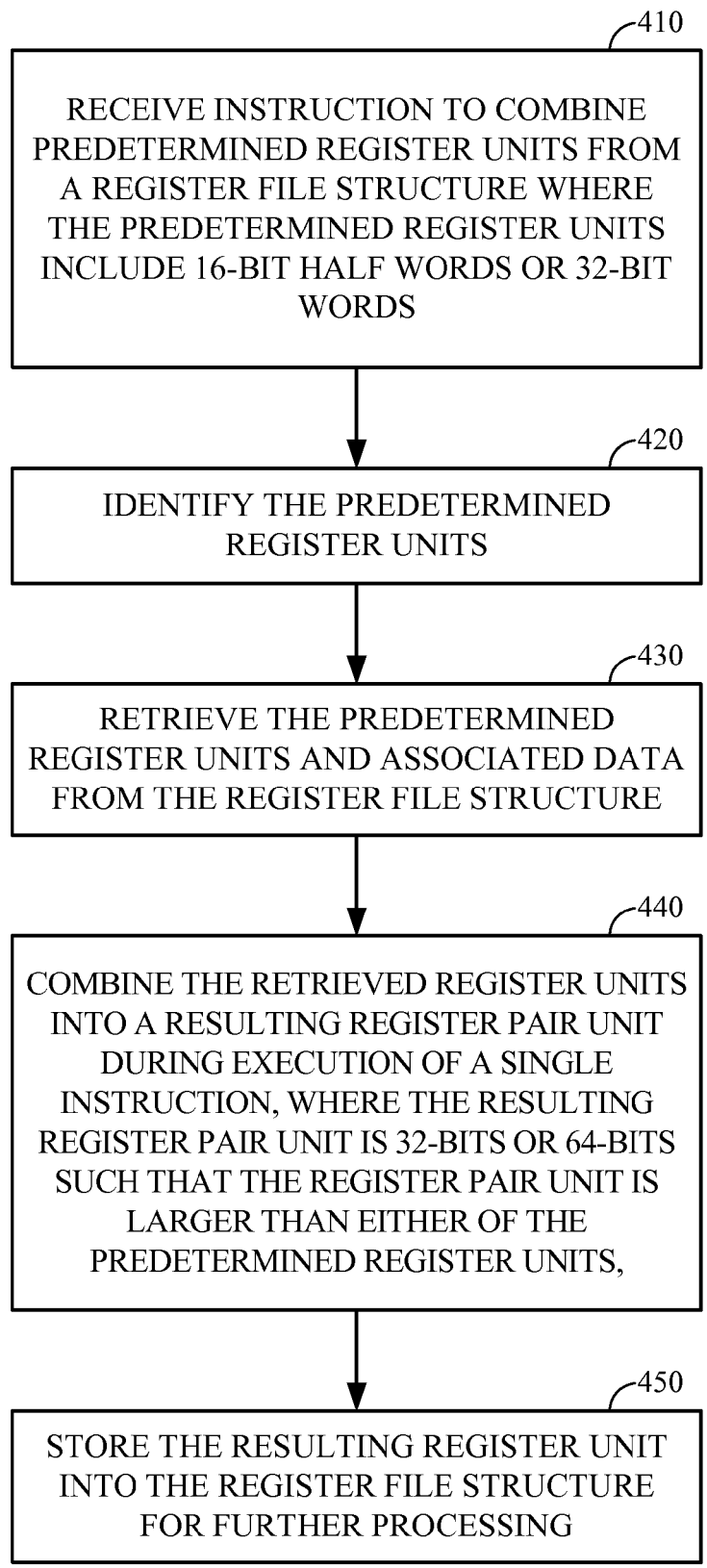
FIG. 4 is a flow diagram illustrating one embodiment of a method to combine register units within the digital signal processing system.

FIG. 4 is a flow diagram illustrating one embodiment of a method to combine predetermined register units within the digital signal processing system 100. As illustrated in the embodiment of FIG. 4, at processing block 410, an instruction to combine/concatenate register units within the digital signal processing system 300 is received. According to particular illustrative embodiments, the predetermined register units may include 16-bit half words or 32-bit words. In one embodiment, an execution unit 345 within the DSP 330 receives the instruction and executes the instruction, as described below, to combine predetermined register units stored in the general register file structure 350. In one embodiment, the predetermined register units are non-adjacently located within the general register file structure.

At processing block 420, the predetermined register units, such as, for example, a first 32-bit wide register unit and a second 32-bit wide register unit, are identified. In one embodiment, the execution unit 345 communicates with the general register file structure 350 and identifies the register units requested to be combined. In one embodiment, the memory 310 then loads data needed by the instruction to the general register file structure 350 via the 64-bit data load bus 322. Alternatively, data may already be stored within the identified first and second register units.

At processing block 430, the identified register units and associated data are retrieved. In one embodiment, the execution unit 345 retrieves the identified register units and associated data from the general register file structure 350.

At processing block 440, the retrieved register units are combined/concatenated within a resulting larger register pair. In one embodiment, the execution unit 345 combines the retrieved register units, such as the first and second 16-bit wide registers or the first and second 32-bit wide register units, and their associated data into a resulting 32-bit register pair unit or a resulting 64-bit wide register pair unit, respectively, such that the first register unit and its associated data are input into a high portion of the resulting register unit and the second register unit and its associated data are input into a low portion of the resulting register unit. The resulting register pair unit is larger than either of the predetermined register units combined to form the resulting register pair unit.

Finally, at processing block 450, the resulting register pair is stored for further processing. In one embodiment, the execution unit 345 outputs the resulting register unit to the general register file structure 350 and stores the resulting register unit for further processing of additional instructions.

Figure 5:
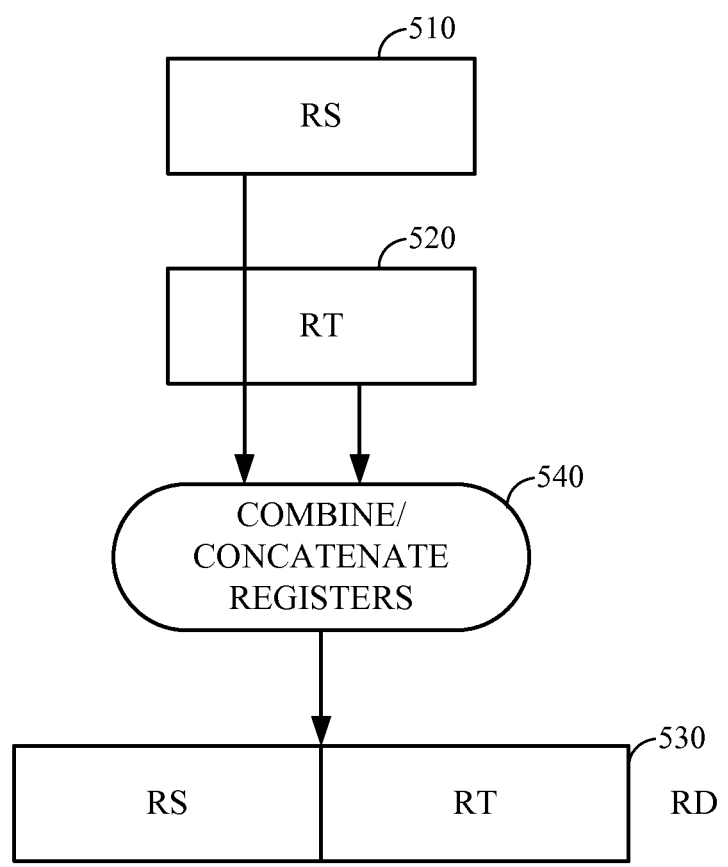
FIG. 5 is a block diagram illustrating the method to combine register units described in connection with FIG. 4.

FIG. 5 is a block diagram illustrating the method to combine register units described in connection with FIG. 4. As illustrated in FIG. 5, source register units $R_S$ 510 and $R_T$ 520 are identified and further retrieved from the general register file structure 350.

In one embodiment, the instruction to combine/concatenate source register units $R_S$ 510 and $R_T$ 520 into a resulting larger destination register unit $R_D$ 530 is:

$R_D$ =combine($R_S$,$R_T$)

Upon execution of the instruction, register units $R_s$ 510 and $R_T$ 520 are combined/concatenated into the resulting larger destination register unit Ro 530, such that data residing into the register unit Rs 510 is input into the high portion of the register unit Ro 530 and data residing into the register unit RT 520 is input into the low portion of the register unit Ro 530. If, for example, Rs 510 and RT 520 are both 32-bit wide register units, then the resulting destination register unit Ro 530 is a 64-bit wide register. The register units $R_S$ 510 and $R_T$ 520 each include either 16-bit half words or 32-bit words. Upon execution of the instruction, register units $R_S$ 510 and $R_T$ 520 are combined/concatenated to form the register unit $R_O$ 530, which is a register unit pair that is larger than either of the register units $R_S$ 510 and $R_T$ 520. For example, when register units $R_S$ 510 and $R_T$ 520 include 16-bit half words, the resulting register unit $R_O$ will be a 32-bit register unit; when register units $R_s$ 510 and $R_T$ 520 include 32-bit words, the resulting register unit $R_O$ will be a 64-bit register unit. As previously described, the register units $R_S$ 510 and $R_T$ 520 are combined/concatenated during execution of a single instruction 540.

Figure 6:
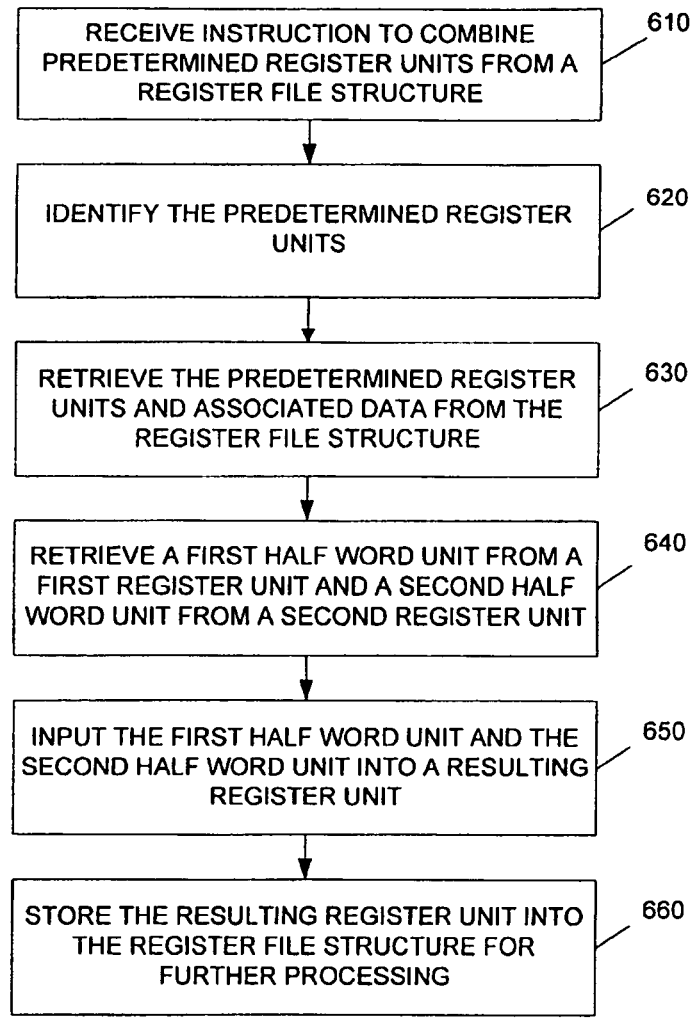
FIG. 6 is a flow diagram illustrating an alternate embodiment of a method to combine register units within the digital signal processing system.

FIG. 6 is a flow diagram illustrating an alternate embodiment of a method to combine register units within the digital signal processing system 300. As illustrated in the embodiment of FIG. 6, at processing block 610, an instruction to combine/concatenate register units within the digital signal processing system 300 is received. In one embodiment, an execution unit 345 within the DSP 330 receives the instruction and executes the instruction to combine predetermined register units stored in the general register file structure 350. In one embodiment, the predetermined register units are non-adjacently located within the general register file structure.

At processing block 620, the predetermined register units, such as, for example, a first 32-bit wide register unit and a second 32-bit wide register unit, are identified. In one embodiment, the execution unit 345 communicates with the general register file structure 350 and identifies the register units requested to be combined. In one embodiment, the memory 310 then loads data needed by the instruction to the general register file structure 350 via the 64-bit data load bus 322. Alternatively, data may already be stored within the identified first and second register units.

At processing block 630, the identified register units and associated data are retrieved. In one embodiment, the execution unit 345 retrieves the identified register units and associated data from the general register file structure 350.

At processing block 640, a first half word unit is retrieved from the first register unit and is input into a resulting register unit. In one embodiment, the execution unit 345 further retrieves a first 16-bit wide half word unit from the first register unit, which may, in one embodiment, be the high half word unit of the first register unit, or, in the alternative, may be the low half word unit of the first register unit, and inputs the first half word unit into a high portion of a resulting register unit.

At processing block 650, a second half word unit is retrieved from the second register unit and is input into the resulting register unit. In one embodiment, the execution unit 345 further retrieves a second 16-bit wide half word unit from the second register unit, which may, in one embodiment, be the high half word unit of the second register unit, or, in the alternative, may be the low half word unit of the second register unit, and inputs the second half word unit into a low portion of the resulting register unit, thus obtaining a 32-bit wide resulting register unit.

Finally, at processing block 660, the resulting register unit is stored for further processing. In one embodiment, the execution unit 345 outputs the resulting register unit to the general register file structure 350 and stores the resulting register unit for further processing of additional instructions.

Figure 7:
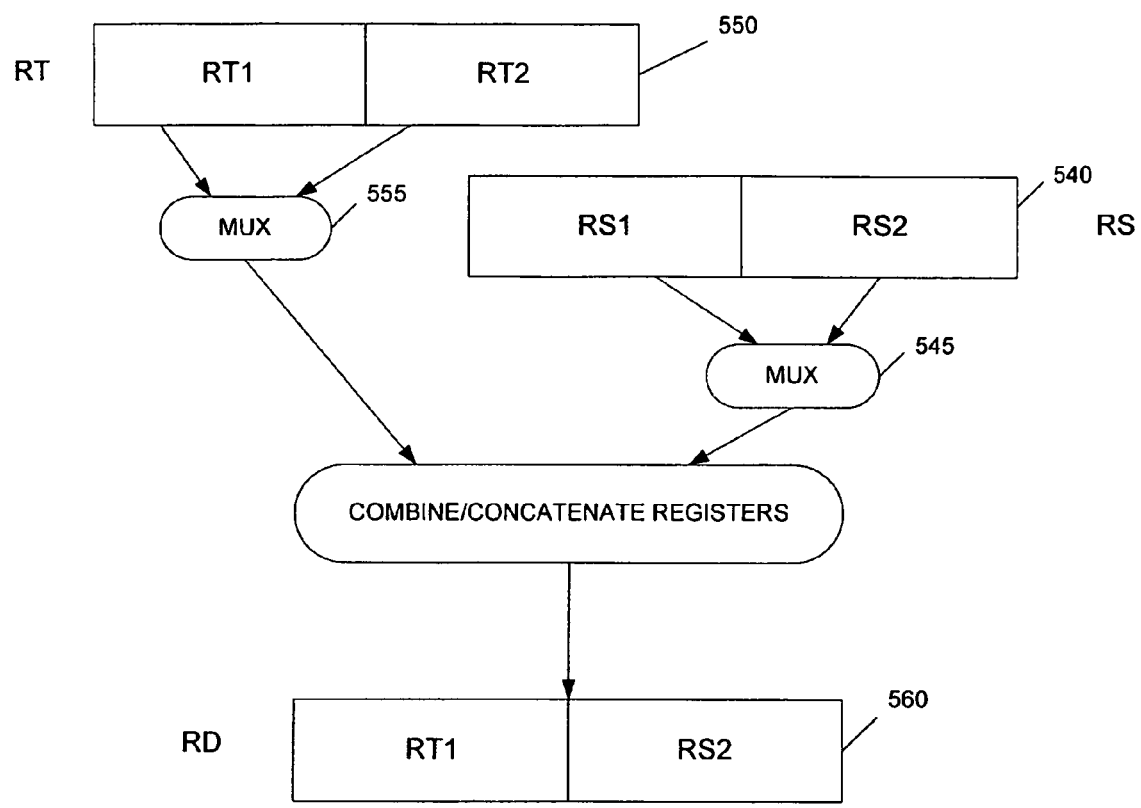
FIG. 7 is a block diagram illustrating the method to combine register units described in connection with FIG. 6.

FIG. 7 is a block diagram illustrating the method to combine register units described in connection with FIG. 6. As illustrated in FIG. 7, source register units $R_S$ 540 and $R_T$ 550 are identified and retrieved from the general register file structure 200.

In one embodiment, the instruction to combine/concatenate source register units $R_S$ 540 and $R_T$ 550 into a resulting destination register unit $R_D$ 560 is:

$R_D$=combine($R_T$. [HL],$R_S$. [HL])

where $R_T$ [HL] is a source register unit $R_T$ having a high half word H and a low half word L, and where $R_S$ is a source register unit $R_S$ having a high half word H and a low half word L.

As shown in FIG. 7, upon execution of the instruction, the high half word $R_{T1}$ of the source register unit $R_T$ 550, or, in the alternative, the low half word $R_{T2}$ of the source register unit $R_T$ 550, is input into the high portion of the register unit $R_D$ 560 via a multiplexer 555 and the high half word $R_{S1}$ of the source register unit $R_S$ 540, or, in the alternative, the low half word $R_{S2}$ of the source register unit $R_S$ 540, is input into the low portion of the register unit $R_D$ 560 via a multiplexer 545. If, for example, $R_S$ 540 and $R_T$ 550 are both 32-bit wide register units, then, in one embodiment, the high half word $R_{T1}$ of the source register unit $R_T$ 550 is 16-bit wide, the lower half word $R_{S2}$ of the source register unit $R_S$ 540 is also 16-bit wide, and, thus, the resulting destination register unit $R_D$ 560 is a 32-bit wide register.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. It is to be understood that these embodiments may be used as or to support software programs, which are executed upon some form of processor or processing core (such as the CPU of a computer), or otherwise implemented or realized upon or within a machine or computer readable medium. A machine readable medium includes any mechanism for storing or transmitting information in a form readable by a machine (e.g., a computer). For example, a machine readable medium includes RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A non-transitory computer readable tangible medium storing an instruction that when executed by a processor, causes the processor to:
   identify a first register unit of a register file structure and a second register unit of the register file structure, wherein the first register unit and the second register unit are not stored adjacently within a row of the register file structure;
   load first data from a memory to the identified first register unit and to load second data from the memory to the identified second register unit; and
   combine the first data comprising all data bits of the loaded first register unit and the second data comprising all data bits of the loaded second register unit to store combined data in a resulting register unit, wherein the resulting register unit is larger than the first register unit and larger than the second register unit.

2. The non-transitory computer readable tangible medium of claim 1, wherein the first data is stored at a first contiguous portion of the resulting register unit and the second data is stored at a second contiguous portion of the resulting register unit.

3. The non-transitory computer readable tangible medium of claim 2, wherein the first register unit comprises a first 32-bit wide register unit, the second register unit comprises a second 32-bit wide register unit, and the resulting register unit comprises a 64-bit wide register unit.

4. The non-transitory computer readable tangible medium of claim 1, wherein the processor is to combine the first data and the second data by concatenating the first data and the second data.

5. The non-transitory computer readable tangible medium of claim 1, further comprising instructions that are executable by the processor to retrieve the loaded first register unit and the loaded second register unit from the register file structure in order to combine the first data and the second data.

6. The non-transitory computer readable tangible medium of claim 1, further comprising instructions that are executable by the processor to store the resulting register unit at the register file structure.

7. A method comprising:
   receiving an instruction to combine data from a first register unit of a register file structure and a second register unit of the register file structure; and
   executing the instruction at a processing unit, wherein executing the instruction comprises:
      identifying the first register unit and the second register unit, wherein the first register unit and the second register unit are not stored adjacently within a row of the register file structure;

loading first data from a memory to the identified first register unit and loading second data from the memory to the identified second register unit; and combining the first data comprising all data bits included in the loaded first register unit and the second data comprising all data bits included in the loaded second register unit to form combined data stored in a resulting register unit, wherein the resulting register unit is larger than the first register unit or the second register unit.

8. The method of claim 7, wherein combining the first data and the second data further comprises including the first data in a first contiguous portion of the resulting register unit and including the second data in a second contiguous portion of the resulting register unit.

9. The method of claim 8, wherein the first register unit comprises a first 32-bit wide register unit, the second register unit comprises a second 32-bit wide register unit, and the resulting register unit comprises a 64-bit wide register unit.

10. The method of claim 7, wherein combining the first data and the second data further comprises retrieving the loaded first register unit and the loaded second register unit from the register file structure.

11. The method of claim 7, wherein combining the first data and the second data comprises concatenating the first data and the second data.

12. The method of claim 7, wherein the resulting register unit is formed during execution of a single instruction.

13. The method of claim 7, further comprising storing the resulting register unit at the register file structure.

14. The method of claim 7, wherein identifying the first register unit and the second register unit comprises sending an identification communication from an execution unit to the register file structure.

15. The method of claim 9, wherein the first data and the second data are concurrently loaded to the identified first register unit and the identified second register unit via a 64-bit data bus.

16. An integrated circuit comprising:
a memory to store packets, each packet comprising one or more instructions; and
a processor coupled to the memory, the processor further comprising a processing unit and a register file structure coupled to the processing unit, wherein the processing unit is operative to execute an instruction to combine data from a first register unit of the register file structure and a second register unit of the register file structure, wherein execution of the instruction causes the processing unit to:
identify the first register unit and the second register unit, wherein the first register unit and the second register unit are not stored adjacently within a row of the register file structure;
load first data from a memory to the identified first register unit and load second data from the memory to the identified second register unit; and
combine the first data comprising all data bits stored in the loaded first register unit and the second data comprising all data bits stored in the loaded second register unit to form combined data stored in a resulting register unit, wherein the resulting register unit is larger than the first register unit or the second register unit.

17. The integrated circuit of claim 16, wherein the processing unit is further operative to receive an instruction to combine the first register unit and the second register unit prior to identifying the first and second register units and to execute the instruction.

18. The integrated circuit of claim 16, wherein the processing unit is further operative to include the first data in a first contiguous portion of the resulting register unit and to include the second data in a second contiguous portion of the resulting register unit.

19. The integrated circuit of claim 18, wherein the first register unit comprises a first 32-bit wide register unit, the second register unit comprises a second 32-bit wide register unit, and the resulting register unit comprises a 64-bit wide register unit.

20. The integrated circuit of claim 16, wherein the processing unit is further operative to retrieve the loaded first register unit and the loaded second register unit from the register file structure in order to combine the first data and the second data.

21. The integrated circuit of claim 16, wherein the processing unit is operative to combine the first data and the second data by concatenating the first data and the second data.

22. The integrated circuit of claim 16, wherein the processing unit is further operative to store the resulting register unit at the register file structure.

23. An apparatus comprising:
means for executing an instruction to combine data from a first register unit of a register file structure and a second register unit of the register file structure;
means for identifying the first register unit and the second register unit to be combined in response to executing the instruction, wherein the first register unit and the second register unit are not stored adjacently within a row of the register file structure;
means for loading first data from a memory to the identified first register unit and loading second data from the memory to the identified second register unit in response to executing the instruction; and
means for combining the first data comprising all data bits included in the loaded first register unit and the second data comprising all data bits included in the loaded second register unit to form combined data stored in a resulting register unit in response to executing the instruction, wherein the resulting register unit is larger than the first register unit or larger than the second register unit.

24. The apparatus of claim 23, further comprising:
means for receiving the instruction to combine the first register unit and the second register unit prior to identifying the first and second register units.

25. The apparatus of claim 23, further comprising means for including the first data in a first contiguous portion of the resulting register unit and for including the second data in a second contiguous portion of the resulting register unit.

26. The apparatus of claim 25, wherein the first register unit comprises a first 32-bit wide register unit, the second register unit comprises a second 32-bit wide register unit, and the resulting register unit comprises a 64-bit wide register unit.

27. The apparatus of claim 23, wherein the means for combining the first data and the second data further comprises means for retrieving the loaded first register unit and the loaded second register unit from the register file structure.

28. The apparatus of claim 23, wherein the means for combining the first data and the second data comprises means for concatenating the first data and the second data.

29. The apparatus of claim 23, further comprising means for storing the resulting register unit at the register file structure.

30. A method comprising:
receiving a communication from an execution unit that identifies a first register of a general register file structure and a second register of the general register file structure in response to execution of an instruction at the execution unit, wherein the first register and the second register are not adjacently located within the general register file structure;
retrieving first data for the identified first register and second data for the identified second register from a memory in response to execution of the instruction;
providing the retrieved first data and the retrieved second data to the execution unit for insertion into a resulting register pair in response to execution of the instruction, where the resulting register pair is larger than the first register or the second register; and
storing the resulting register pair at the general register file structure in response to execution of the instruction.

31. The method of claim 30, wherein the first data is in a first contiguous portion of the resulting register pair and the second data is in a second contiguous portion of the resulting register pair.

32. The method of claim 31, wherein the first register comprises a first 32-bit wide register, the second register comprises a second 32-bit wide register, and the resulting register pair comprises a 64-bit wide register.

33. A method comprising:
receiving an instruction to combine data from a first register unit of a register file structure and a second register unit of the register file structure; and
executing the instruction at a processing unit, wherein executing the instruction comprises:
identifying the first register unit and the second register unit, wherein the first register unit and the second register unit are not stored adjacently within a row of the register file structure;
loading first data from a memory to the identified first register unit and loading second data from the memory to the identified second register unit; and
combining the first data comprising a first portion of data bits included in the loaded first register unit and the second data comprising a second portion of data bits included in the loaded second register unit to form combined data stored in a resulting register unit.

34. The method of claim 33, wherein the first portion is a first half of the data bits included in the loaded first register unit and the second portion is a second half of the data bits included in the loaded second register unit.

35. The method of claim 33, wherein the resulting register unit, the first register unit, and the second register unit are the same size.

* * * * *